United States Patent [19]

Shiki et al.

[11] Patent Number: 5,733,214

[45] Date of Patent: Mar. 31, 1998

[54] SYSTEM FOR ADJUSTING TENSION OF ENDLESS TRANSMITTING BELT IN INTERNAL COMBUSTION ENGINE

[75] Inventors: Katsuaki Shiki; Kaoru Shimamura; Tsutomu Saka, all of Wako, Japan

[73] Assignee: Honda Giken Kogyo Kabushiki Kaisha, Tokyo, Japan

[21] Appl. No.: 657,464

[22] Filed: May 29, 1996

[30] Foreign Application Priority Data

May 30, 1995 [JP] Japan .................................. 7-132172

[51] Int. Cl.⁶ .................................................. F16H 61/00
[52] U.S. Cl. ........................ 474/69; 474/70; 474/110; 474/139
[58] Field of Search ............................. 474/69, 70, 101, 474/109, 110, 139

[56] References Cited

U.S. PATENT DOCUMENTS

| | | | |
|---|---|---|---|
| 4,077,272 | 3/1978 | Busso | 474/110 |
| 4,959,042 | 9/1990 | Tanaka et al. | 474/135 X |

FOREIGN PATENT DOCUMENTS

| | | |
|---|---|---|
| 62-44187 | 11/1987 | Japan . |
| 63-18664 | 2/1988 | Japan . |

*Primary Examiner*—Roger J. Schoeppel
*Attorney, Agent, or Firm*—Nikaido Marmelstein Murray & Oram LLP

[57] ABSTRACT

In a system for adjusting the tension of an endless transmitting belt in an internal combustion engine, a control system automatically adjusts the tension to be applied from a tensioner to the endless transmitting belt. The control system includes a driving-side rotational state detecting device for detecting the rotational state of a driving wheel which drives the endless transmitting belt. A driven-side rotational state detecting device detects the rotational state of a driven wheel driven by the endless transmitting belt. A control unit calculates a difference in rotational phase between the driving and driven wheels from results of detection by both rotational state detecting devices and controls the operation of a tension changing device in accordance with the difference in rotational phase. Thus, it is possible to accurately and quickly accommodate a very small variation in tension of the transmitting belt without specially using a strain gauge.

18 Claims, 2 Drawing Sheets

FIG.2A

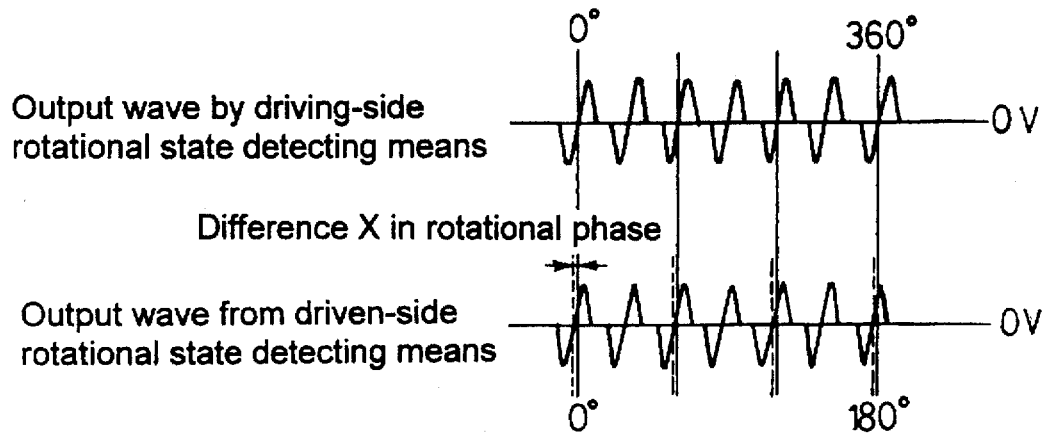

Output wave by driving-side rotational state detecting means

Difference X in rotational phase

Output wave from driven-side rotational state detecting means

FIG.2B

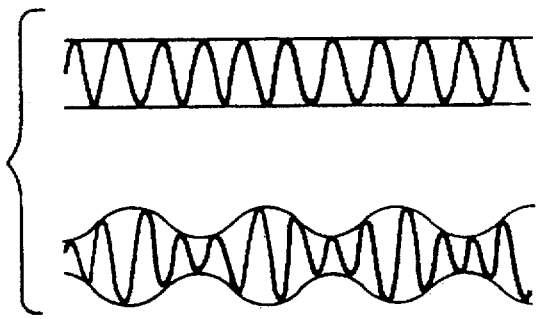

Composite wave forms are different depend on a dgree of the difference in phase

FIG.2C

Composite wave form (DC component) when there is no difference in phase

Composite wave form (AC component) when there is a difference in phase

SYSTEM FOR ADJUSTING TENSION OF ENDLESS TRANSMITTING BELT IN INTERNAL COMBUSTION ENGINE

BACKGROUND OF THE INVENTION

1. Field of the Invention

The present invention relates to a system for adjusting a tension of an endless transmitting belt in an internal combustion engine. A tensioner device includes a tensioner which is in contact with the endless transmitting belt. A tension changing device is capable of changing the tension to be applied from the tensioner to the endless transmitting belt. A control means automatically adjusts the tension.

2. Description of the Related Art

Various tension adjusting systems have been conventionally proposed to provide an accurate transmission of power, an enhancement in life expectancy of the transmitting belt by a stabilization of the tension, a reduction in transmitting sound and the like by suppressing the variation in tension of the transmitting band.

In the type of system designed to automatically adjust the tension, the tensioned state of the transmitting belt is detected using a tension sensor, and the operation of the tension changing means is controlled based on the detection result.

Conventionally known tension sensors include, for example, (1) a tension sensor adapted to detect a reaction force of a tensioner (for example, see Japanese Utility Model Publication No.62-44187), (2) a tension sensor adapted to detect a strain of a rotatable support shaft of a tensioner (for example, see Japanese Utility Model Application Laid-open No. 63-18664), (3) a tension sensor adapted to directly detect a strain of a core wire of a transmitting belt, and the like.

In any of these conventionally known tension detecting methods, a strain gauge is used. However, the service temperature of the tension sensor is generally in a wider range of −35° to 150° C. Hence, the temperature of the gauge must be compensated, and in practical use of the sensor, the reliability and durability of the sensor are considerations.

Particularly, in a system for adjusting the tension of a timing belt which drives a valve operating cam shaft, a dynamic variation in tension of the belt (which is called an effective tension of belt) is liable to be produced under influences of a variation in rotation of a crank shaft and a variation in rotational torque due to an intermittent explosion stroke of an engine. The frequency of a variation in effective tension is varied depending upon the number of cylinders of the internal combustion engine and the layout of the belt, but reaches about 100 Hz at maximum. Size of a waveform of the frequency is varied depending upon the number of revolutions of the engine and the operational state of the engine. The reaction force of the tensioner and the strain of the tensioner support shaft are varied as is the effective tension. For this reason, a detection value output from the strain gauge becomes an AC component wave. However, in adjusting the tension of the belt, it is difficult, from the view point of frequency, to control the operation of the tension adjusting system in correspondence to a variation in AC component of the effective tension of the belt. Therefore, it is necessary to specially carry out an AC/DC conversion. In such a case, however, the effective tension is randomly varied in degree. For this reason, even a degree component of the waveform output from the strain gauge is varied, resulting in a very complicated AC/DC converting circuit, which is not preferable in practical use.

There is also a conventionally known technique for adjusting the tension by detecting the tensioned state of the belt without use of a strain gauge, which involves counting the number of revolutions of driving and driven wheels over which a belt is wound, and adjusting the tension in accordance with a difference in number of revolutions, for example, as disclosed in Japanese Utility Model Application Laid-open No. 60-172048. However, such a technique suffers from the following problem: unless a slipping of the belt causing the generation of a difference in number of revolutions (i.e., a difference in rotational speed) between the driving and driven wheels is actually produced, the adjustment of the tension is not carried out. In other words, in a tension-decreased state in which the belt is slightly loosened, the adjustment of the tension is not carried out. For this reason, it is impossible to accurately accommodate a very small decrease in tension, and the adjustment of the tension is slightly delayed.

SUMMARY OF THE INVENTION

Accordingly, it is an object of the present invention to provide a system for adjusting the tension of an endless transmitting belt in an internal combustion engine, wherein a vary small variation in tension of the transmitting belt can be accurately and quickly accommodated without use of a strain gauge.

To achieve the above object, according to a first aspect and feature of the present invention, there is provided a system for adjusting a tension of an endless transmitting belt in an internal combustion engine, including a tensioner device including a tensioner which is in contact with the endless transmitting belt, a tension changing device capable of changing the tension to be applied from the tensioner to the endless transmitting belt and a control device for automatically adjusting the tension. The control device includes a driving-side rotational state detecting device for detecting a rotational state of a driving wheel for driving the endless transmitting belt, a driven-side rotational state detecting device for detecting a rotational state of a driven wheel driven by the endless transmitting belt and a control unit for calculating a difference in rotational phase between the driving and driven wheels from results of detection by both the rotation state detecting devices and controlling the operation of the tension changing device in accordance with the difference in rotational phase between the driving and driven wheels.

With the above first feature of the present invention, the control unit calculates a difference in rotational phase between the driving and driven wheels from results of detection by both the rotational state detecting devices and controls the operation of the tension changing device in accordance with the difference in rotational phase between the driving and driven wheels. Therefore, even if a relatively very small variation in tension is produced in the transmitting belt, the operation of the tension changing device can be controlled in accordance with the difference in rotational phase between the driving and driven wheels which is varied with the variation in tension, thereby adjusting the tension. Thus, it is possible to accurately and quickly accommodate a very small variation in tension of the transmitting belt without specially using a strain gauge. Moreover, the rotational state of each of the driving and driven wheels can be relatively easily detected without specially accommodating for temperature. Also, the processing for calculating the difference in rotational phase between the driving and driven wheels from the rotational states of the driving and driven wheels is relatively easy, leading to a simplified arrangement of a processing circuit.

In addition, according to a second aspect and feature of the present invention, in addition to the first feature, the control unit sets control quantities to increase the tension when the difference in rotational phase becomes equal to or greater than a predetermined upper limit, and to decrease the tension when the difference in rotational phase becomes equal to or smaller than a predetermined lower limit, and controls the operation of the tension changing device based on the control quantities.

With the above second feature of the present invention, the difference in rotational phase between the driving and driven wheels falls into a range between the predetermined upper and lower limits. As a result, the tension of the transmitting belt can also fall into a predetermined proper range.

The above and other objects, features and advantages of the invention will become apparent from the following detailed description of a preferred embodiment taken in conjunction with the accompanying drawings.

DESCRIPTION OF THE DRAWINGS

FIGS. 2A, 2B and 2C are diagrams for explaining specific examples for calculating a difference in rotational phase between driving and driven wheels.

DETAILED DESCRIPTION OF THE PREFERRED EMBODIMENTS

Figure 1:
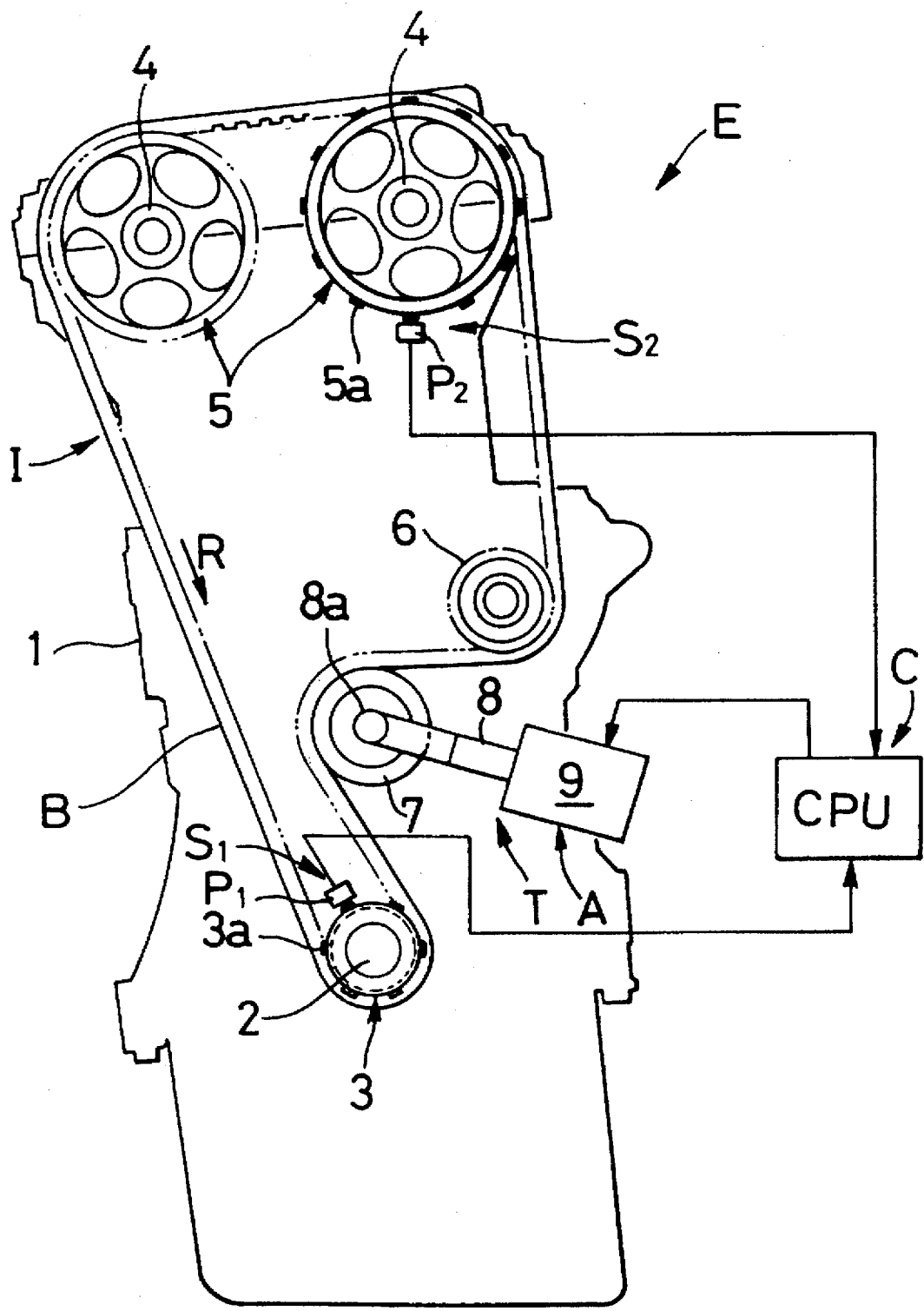
FIG. 1 is a side view illustrating the outline of a system for adjusting the tension of an endless transmitting belt according to an embodiment of the present invention.

The present invention will now be described by way of a preferred embodiment with reference to the accompanying drawings.

Referring first to FIG. 1, a wrapping type timing connector driving mechanism I is disposed on one side of an engine body 1 of a 4-cycle and multi-cylinder internal combustion engine. The wrapping type timing connector driving mechanism I includes a crank pulley 3 as a driving wheel connected to a crankshaft 2, a pair of cam pulleys 5, 5 as driven wheels connected to a pair of valve operating cam shafts 4, 4, a rotatable idle pulley 6, and a timing belt B as an endless transmitting belt wound over the pulleys 3, 5 and 6. The belt B is rotated in a direction indicated by an arrow R (in FIG. 1) in the illustrated embodiment. A tensioner device T for automatically adjusting the tension of the timing belt B is mounted to the wrapping type timing connector driving mechanism I on a loosening side of the timing belt B, specifically, halfway between the crank pulley 6 and the idle pulley 9.

The tensioner device T includes a tension pulley 7 serving as a tensioner which is in contact with the timing belt B, and an actuator A (explained below) for displacing the tension pulley 7 to advance and retreat toward and away from the timing belt B. The actuator A constitutes a tension changing device which is capable of changing the tension to be applied from the tension pulley 7 to the belt B. The tensioner device T includes a means for applying a predetermined initial urging force to the tension pulley 7 in order to apply, to the timing belt B even during stoppage of the engine, a necessary and minimum tension as small as a transmitting ability is lost even when the belt B has been loosened to the maximum extent due to a low temperature, an elongation of the belt, and the like. For example, a mechanical spring or the actuator A itself can be used as the initial urging-force applying means. Particularly, when the actuator A is used, the actuator A may be operated in order to apply the initial urging force to the tension pulley 7 after the ignition of the engine and before the start thereof.

The actuator A includes a support arm 8 which rotatably carries the tension pulley 7 at its tip by a pin 8a, and an actuator body 9 which supports the support arm 8 for advancing and retreating movement toward and away from the timing belt B. The actuator body 9 is integrally mounted to a side of the engine body 1. A well-known electric drive is mounted in the actuator body 9 and is capable of driving the support arm 8 (and thus the tension pulley 7) to advance and retreat toward and away from the timing belt B in response to a control electric current output from a control unit CPU including a central processing unit disposed in place out of the engine body 1.

The engine body 1 is provided with a driving-side rotational state detecting means $S_1$ for detecting the rotational state of the crank pulley 3 as the driving wheel, and a driven-side rotational state detecting means $S_2$ for detecting the rotational state of one of the cam pulleys 5 as the driven wheel. The driving-side rotational state detecting means $S_1$ includes an electromagnetic pick-up $P_1$ mounted to the engine body 1 in the vicinity of an outer peripheral portion of the crank pulley 3, and a plurality of pulser protrusions 3a made of a magnetic material and provided on the outer peripheral portion of the crank pulley 3 at circumferentially equal distances to cooperate with the electromagnetic pick-up $P_1$. The electromagnetic pick-up $P_1$ periodically generates a pulse current in a coil of the electromagnetic pick-up $P_1$ by the magnetic flux around the coil being changed in response to the movement of each of the pulser protrusions 3a toward or away from the electromagnetic pick-up $P_1$ with the rotation of the crank pulley 3. The pulse current enables the detection of the rotational state, e.g., the rotational speed, the rotational phase, a variation in rotation and the like of the crank pulley 3 rotating in unison with the crankshaft 2.

The driven-side rotational state detecting means $S_2$ includes an electromagnetic pick-up $P_2$ mounted to the engine body 1 in the vicinity of an outer peripheral portion of one of the cam pulleys 5, and a plurality of pulser protrusions 5a made of a magnetic material and provided on the outer peripheral portion of the cam pulley 5 in circumferentially equal distances in order to cooperate with the electromagnetic pick-up $P_2$. The electromagnetic pick-up $P_2$ generates a pulse current in a coil of the electromagnetic pick-up $P_2$ by the magnetic flux around the coil being changed in response to the movement of each of the pulser protrusions 5a toward or away from the electromagnetic pick-up $P_2$ with the rotation of the cam pulley 5. The pulse current enables the detection of the rotational state, e.g., the rotational speed, the rotational phase, the variation in rotation and the like of the cam pulley 5 rotating at a reduction ratio of ½ relative to the crank pulley 3.

In the driving-side and driven-side rotational state detecting means $S_1$ and $S_2$, the electromagnetic pick-ups $P_1$ and $P_2$ and the pulser protrusions 3a and 5a are disposed at locations where pulse signals can be simultaneously output from the detecting means $S_1$ and $S_2$, respectively, if there is no difference in rotational phase between the crank pulley 3 and the cam pulley 5 during transmission. The number of the pulser protrusions 5a of the driven-side rotational state detecting means $S_2$ is twice the number of the pulser protrusions 3a of the driving-side rotational state detecting means $S_1$ in correspondence to the reduction ratios of the pulleys 3 and 5, so that the output pulses from the detecting means $S_1$ and $S_2$ have the same frequency. Moreover, the number of the pulser protrusions 5a of the driven-side rotational state detecting means $S_2$ is properly selected to a number (12 in the illustrated embodiment) which is required to be able to appropriately detect a difference in rotational phase between the pulleys 3 and 5, in consideration of the processing ability of the control unit CPU, a variation in rotation of the engine and the like.

The electromagnetic pick-ups $P_1$ and $P_2$ of the driving-side and driven-side rotational state detecting means $S_1$ and $S_2$ are connected to the control unit CPU. During operation of the engine, pulse signals emitted from the electromagnetic pick-ups $P_1$ and $P_2$ are input to the control unit CPU. Then, the control unit CPU calculates a difference in rotational phase between the pulleys 3 and 5 from the output pulses from the rotational state detecting means $S_1$ and $S_2$ in a manner which will be described hereinafter, and controls the advancing or retreating amount of the actuator A in accordance with the difference in rotational phase. The control unit CPU and the rotational state detecting means $S_1$ and $S_2$ cooperate with each other to constitute a control means C for automatically adjusting the tension to be applied from the tension pulley 7 to the timing belt B.

The operation of the embodiment will be described below. During operation of the internal combustion engine E, the cam pulley 5 is rotated at a reduction ratio of ½ through the timing belt B in operative association with the crank pulley 3. In response to the rotation of the pulleys 3 and 5, the output pulses from the rotational state detecting means $S_1$ and $S_2$ are input to the control unit CPU.

The timing belt B has an elongation and the like and hence, even if the belt B is in a proper tensioned state, a slight difference in rotational phase between both the pulleys 3 and 5 (i.e., a delay in rotational phase of the cam pulley 5 relative to the crank pulley 3) is generated. The difference in rotational phase tends to be increased with a decrease in tension of the belt from a proper range and decreased with an increase in tension from the proper range. Therefore, in the illustrated embodiment, when the difference X in rotational phase between the pulleys 3 and 5 is increased to a predetermined upper limit (2 degree in terms of the rotational angle of the cam pulley) or more due to the loosening of the timing belt B, the control unit CPU establishes a predetermined control quantity to correct the tension of the belt into an increased value, so that a control electric current depending upon the control quantity is output to the actuator A. On the other hand, when the difference X in rotational phase between the pulleys 3 and 5 is decreased to a predetermined lower limit (e.g., 1.5 degree in terms of the rotational angle of the cam pulley) or less due to the tensioning of the timing belt B, the control unit CPU establishes a predetermined control quantity to correct the tension of the belt into a decreased value, so that a control electric current depending upon the control quantity is output to the actuator A. In some cases, it may be necessary to determine the rotating range of the engine for sampling the detection data and the time required for the sampling.

Thus, when the difference X in rotational phase is equal to or larger than the predetermined upper limit, the actuator A is operated to increase the tension of the belt, and when the difference X in rotational phase is equal to or smaller than the predetermined lower limit, the actuator A is operated to decrease the tension of the belt. Therefore, the difference X in rotational phase between both the pulleys 3 and 5 can fall within a predetermined proper range (e.g., in a range of 1.5 to 2 degree in terms of the rotational angle of the cam pulley), thereby adjusting and maintaining the tension of the belt to and at a predetermined proper range.

In calculating the difference X in rotational phase, a displacement angle at the time when the output pulse from each of the rotational state detecting means $S_1$ and $S_2$ passes a predetermined reference site (e.g., 0 V), is detected, for example, as shown in FIG. 2A, and the difference X in rotational phase between the crank pulley 3 and the cam pulley 5 can be determined directly from such a detection value.

Alternatively, output waves from the rotational state detecting means $S_1$ and $S_2$ can be composited to calculate a difference X in rotational phase from the size and the degree of variation of resultant composite waveforms. This utilizes the fact that different composite waveforms appear, for example, as shown in FIG. 2B, due to a difference between differences in rotational phase.

Further alternatively, output waves from the rotational state detecting means $S_1$ and $S_2$ can be composited as opposite phases to calculate a difference X in rotational phase from the size and the degree of variation of resultant composite waveforms. In this case, when there is no difference in rotational phase, the composite waveform is a DC component, and when there is a difference in rotational phase as shown in FIG. 2C, the composite waveform is an AC component, as shown in FIG. 2C.

With the structure of the embodiment, even if the timing belt B produces a relatively very small variation in tension, the operation of the actuator A can be controlled to adjust the tension in accordance with that difference in rotational phase between the crank pulley 3 and the cam pulley 5 which is varied with the variation in tension. Therefore, it is possible to accurately and quickly accommodate a very small variation in tension of the belt B without specially using a strain gauge, thereby stabilizing the tension of the belt. Moreover, the rotational state of each of the crank pulley 3 and the cam pulley 5 can be relatively easily detected without specially compensating for temperature. This can contribute to improvements in reliability and durability of the system. Additionally, the processing for calculating the difference in rotational phase from the rotational states of the crank pulley 3 and the cam pulley 5 is relatively easy and therefore, the arrangement of a processing circuit is simplified.

The position of the tension pulley may be on the driven side (i.e., the loosening side) as in the embodiment, or on the driving side (i.e., the tensioning side) of the timing belt. In a multi-shaft layout, the tension pulley may be placed between any pulleys. If the output pulses from the driving-side and driven-side rotational state detecting means have the same frequency, it is possible to calculate a difference phase even in either of the same phase and opposite phases. In addition to the structure in which the pulser protrusions are provided on the outer peripheral portion of the pulley as in the illustrated embodiment, an exclusive pulser gear may be provided directly on the crankshaft (the driving shaft) and the valve operating cam shaft (the driven shaft), or may be provided on an additional member which is fixed to these shafts to rotate in unison with the shafts. Although the timing belt has been illustrated as an endless transmitting belt in the embodiment, any of an auxiliaries-driving belt other than the timing belt, a timing chain or an auxiliaries-driving chain may be used.

Although the embodiment of the present invention has been described, it will be understood that the present invention is not limited to the above-described embodiment, and various modifications and variations may be made without departing from the spirit and scope of the invention defined in claims.

What is claimed is:

1. A system for adjusting a tension of an endless transmitting belt in an internal combustion engine, comprising:

a tensioner device including a tensioner which is in contact with the endless transmitting belt;

a tension changing device for changing the tension to be applied from said tensioner to said endless transmitting belt; and a control means for automatically adjusting the tension, wherein said control means includes a driving-side rotational state detecting means for detecting a rotational state of a driving wheel for driving said endless transmitting belt, a driven-side rotational state detecting means for detecting a rotational state of a driven wheel driven by said endless transmitting belt, and a control unit for calculating a difference in rotational phase between said driving and driven wheels from results of detection by both said rotational state detecting means and for controlling the operation of said tension changing device in accordance with said difference in rotational phase between said driving and driven wheels, wherein said control unit sets control quantities to increase the tension when said difference in rotational phase becomes equal to or greater than a predetermined upper limit, and to decrease the tension when said difference in rotational phase becomes equal to or smaller than a predetermined lower limit, and controls the operation of said tension changing device based on said control quantities.

2. A system according to claim 1, wherein when said difference in rotational phase between said driving and driven wheels is 1.5 degrees or less, said control unit operating said tension changing device.

3. A system according to claim 1, wherein said rotational state detecting means each include an electromagnetic pick-up and a plurality of pulser protrusions of magnetic material.

4. A system according to claim 3, wherein said driving-side rotational state detecting means is mounted in a vicinity of a crank pulley and said driven-side rotational state detecting means is mounted in a vicinity of one of a plurality of cam pulleys.

5. A system according to claim 4, wherein said cam pulley rotates at a reduction ratio of ½ relative to the crank pulley.

6. A system according to claim 1, wherein a number of pulses detected by said driven-side rotational state detecting means is twice the number of pulses detected by said driving-side rotational state detecting means.

7. A system according to claim 3, wherein a number of pulser protrusions of said driven-side rotational state detecting means is twelve, and a number of pulser protrusions of said driving-side rotational state detecting means is six.

8. A system according to claim 1, wherein when said difference is rotational phase between said driving and driven wheels is two degrees or more, said control unit operating said tension changing device.

9. A system according to claim 1, wherein said upper limit is two degrees in terms of rotational angle of the cam pulley.

10. A system according to claim 1, wherein said lower limit is 1.5 degrees in terms of rotational angle of the cam pulley.

11. A system according to claim 1, wherein said difference in rotational phase is based upon a displacement angle at a time when a output pulse from each rotational state detecting means possess a predetermined reference site.

12. A system according to claim 1, wherein output waveforms from said rotational state detecting means are composited and said difference in rotational phase is calculated from size and degree of variation of said composite waveforms.

13. A system according to claim 12, wherein said output waveforms are composited as opposite phases, wherein when no difference in rotational phase is detected a composite DC waveform is output, and when there is a difference in rotational phase, the composite wave is an AC component.

14. A system according to claim 1, wherein said driving wheel is a crank pulley and said driven wheel is a cam pulley.

15. A system according to claim 14, wherein the predetermined upper limit is greater than the predetermined lower limit.

16. A system according to claim 15, wherein the predetermined upper limit is 2 degrees in terms of the rotational angle of said driven wheel, and the predetermined lower limit is 1.5 degrees in terms of the rotational angle of said driven wheel.

17. A system according to claim 1, wherein the predetermined upper limit is greater than the predetermined lower limit.

18. A system according to claim 17, wherein the predetermined upper limit is 2 degrees in terms of the rotational angle of said driven wheel, and the predetermined lower limit is 1.5 degrees in terms of the rotational angle of said driven wheel.

\* \* \* \* \*

UNITED STATES PATENT AND TRADEMARK OFFICE
CERTIFICATE OF CORRECTION

PATENT NO. : 5,733,214

DATED : March 31, 1998

INVENTOR(S) : Shiiki et al.

It is certified that error appears in the above-identified patent and that said Letters Patent is hereby corrected as shown below:

On title page,
Item [75], line 1, delete "Katsuaki Shiki" insert therefor

-- Katsuaki Shiiki --.

Signed and Sealed this

Sixteenth Day of June, 1998

*Attest:*

BRUCE LEHMAN

*Attesting Officer*   *Commissioner of Patents and Trademarks*